(12) United States Patent
Amir et al.

(10) Patent No.: US 7,032,212 B2
(45) Date of Patent: Apr. 18, 2006

(54) METHOD AND SYSTEM FOR GENERATING TEST MATRICES FOR SOFTWARE PROGRAMS

(75) Inventors: Erez Amir, Even Yehuda (IL); Dan Bar-Lev, Zichron Yaakov (IL); Yoel Arnon, Haifa (IL); Liron Schur, Haifa (IL)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 10/139,846

(22) Filed: May 6, 2002

(65) Prior Publication Data

US 2003/0208744 A1 Nov. 6, 2003

(51) Int. Cl.
 *G06F 9/44* (2006.01)
(52) U.S. Cl. .................... 717/124; 717/126
(58) Field of Classification Search ............... 714/738, 714/143; 717/108, 143, 124–131; 704/232; 707/1
 See application file for complete search history.

(56) References Cited

U.S. PATENT DOCUMENTS

| 5,159,600 | A | * | 10/1992 | Chintapalli et al. ......... 714/738 |
| 5,495,571 | A | | 2/1996 | Corrie et al. |
| 5,513,315 | A | | 4/1996 | Tierney et al. |
| 5,745,767 | A | | 4/1998 | Rosen et al. |
| 5,754,755 | A | | 5/1998 | Smith |
| 5,774,725 | A | | 6/1998 | Yadav et al. |
| 6,067,639 | A | | 5/2000 | Rodrigues et al. |
| 6,408,403 | B1 | | 6/2002 | Rodrigues et al. |
| 6,557,120 | B1 | | 4/2003 | Nicholson et al. |
| 6,577,982 | B1 | | 6/2003 | Erb |
| 2002/0170042 | A1 | * | 11/2002 | Do et al. .................... 717/143 |
| 2003/0236765 | A1 | * | 12/2003 | Pulst et al. .................... 707/1 |

* cited by examiner

*Primary Examiner*—Tuan Dam
*Assistant Examiner*—Chih-Ching Chow
(74) *Attorney, Agent, or Firm*—Workman Nydegger

(57) ABSTRACT

Methods and data structures are disclosed for a program module (e.g., API) test matrix generator system/process. The disclosed methods and data structures facilitate and carry out a streamlined, yet logically thorough test to verify the proper operation and/or expose errors within the program module under test. The method comprises breaking a set of input parameters to the program module into clusters of related parameters (i.e., parameters whose values affect each other's validity regarding the output of the program module). Thereafter, a set of groups, representing different usages of a set of clustered parameters, are identified. After identifying the groups, a set of test calls (or a test matrix) is rendered for the program module. A covering set of test calls for a particular cluster comprises a sum of all logically/operationally distinct input value combinations rendered for each group. Such distinct input value combinations are rendered according to parameter equivalence classes defined for each parameter of each one of the cluster's groups. An actual test call includes a representative set of parameter values for a particular selected combination of equivalence classes.

38 Claims, 4 Drawing Sheets

METHOD AND SYSTEM FOR GENERATING TEST MATRICES FOR SOFTWARE PROGRAMS

FIELD OF THE INVENTION

This invention generally relates to the area of computer systems. The present invention concerns software development tools, and in particular, methods and systems for generating test matrices for verifying the proper operation of computer programs including an interface for receiving a set of parameter values.

BACKGROUND OF THE INVENTION

There exists a general need in the development of software/systems to ensure that the finished product is sufficiently tested prior to its release to the public. One form of testing comprises submitting various combinations of values in accordance with a specified program interface (e.g., an application programming interface). In many, if not most, cases a large number of input parameters, and the many different potential values assignable to each of those input parameters precludes exhaustive testing of the program code. As a result, previous methods for testing software settled for less than complete coverage for program modules that receive a set of input parameter values.

One method of testing involves submitting all, or a random subset of all, conceivable bit combinations to a program interface and observing the operation and/or results of each unique input bit combination. Many, if not most, program interfaces accept several parameters potentially comprising a large number of total bits rather than a few parameters comprising a relatively small number of total bits. In cases where the results are manually observed/analyzed, the cost of adequately testing a program module becomes prohibitive. As an example of the impracticality of testing every conceivable bit combination, consider an API (application program interface) that receives four double word (2×16 bit) parameters for a total of 128 bits. Testing every input bit combination requires $2^{128}$, or two to the one hundred twenty-eighth power (an eternity) input bit combinations. Many API's accept even greater numbers of parameters/bits.

A number of alternative approaches to reducing (diluting) a test matrix, comprising a set of test input parameter value combinations to a program module, are known. Such approaches utilize a reduced number of parameter values, and in some cases as little as one value, from a class of values having the same effect upon the code (parameter value equivalence classes). However, the alternative combination reduction approaches, described further herein below, do not adequately address complex program interfaces that accept a large number of variables having complex co-relations and inter-dependencies. By way of example, the well known MICROSOFT API "MQSendMessage" has 192 parameters. Classes of particular input parameter values ("equivalence classes") having similar effect upon the program module are defined, and a single value from each equivalence class is used to define/generate a test matrix providing minimal coverage for the potential input parameter value combinations. However, the total number of distinct input combinations still remains prohibitively large. Alternatively, some combinations are skipped to reduce the total number of test input parameter combinations, but such dilution introduces the possibility of missing an important combination.

A well-known test matrix generation method, "PICT," adopts a dilution scheme that reduces coverage to value combinations of two parameters. The value combinations are diluted according to defined equivalence classes of parameter values. The success of this test matrix dilution scheme assumes that a program error will result in a failure over a certain combination of two parameter values. A simple example shows why this assumption is unfounded. Consider a function called calc(x,op,y) which returns the value of x<op>y. Setting x=0 is fine, setting y=0 is OK and setting op=^ is also good. But pair-wise testing does not guarantee coverage of the three-parameter combination 0^0. In fact, there's a good chance it never will: having covered 0^a, a^0(a≠0) and 0+0, there's no need (according to this solution) to check 0^0. Thus, the above pair-wise test generation/execution method does not ensure a program path associated with the input parameter values x=0, y=0 and op=^ is good.

SUMMARY OF THE INVENTION

The present invention comprises a method for testing a program module (e.g., API) by rendering a set of calls to the program module based upon a test model and a given list of values to be used with the test model. The test model facilitates producing the final test matrix for the program module that includes a reduced number of combinations, yet maintains a high degree of assurance that, from a programming logic point of view, test coverage is sufficient. The present invention also comprises a structure for defining a model from which a set of program module test calls are rendered. The test model structure, and test generation method and test matrix generator significantly reduce the number of distinct parameter input combinations to achieve satisfactory logical coverage of a program module under test.

The method and test generation/execution system of the present invention use knowledge of a program module's structure to define the relations between the parameters, and hence reduce the number of combinations of parameter values contained within a test matrix that thoroughly verifies the proper operation of the program module. Reducing the test matrix combinations is accomplished by justified dilutions arising from knowledge of the program's logical operation. Such dilutions are achieved by "clustering" parameters that have an effect upon one another, and then identifying groups (i.e., uses) of the cluster parameters. During the actual generation of test input combinations, attention is directed to operationally unique combinations of values (both valid and invalid) for parameters within the clusters in accordance with the specified groups/uses of the input parameters. Changes in values of parameters outside a particular cluster of input parameters do not affect the execution of portions of the program module associated with the particular cluster of input parameters (i.e. parameters within different clusters are orthogonal, or unrelated, to each other). Applying a logically covering set of test input combinations (generated according to the specified clusters and groups) to the program module and analysis of the results potentially consume considerably (orders of magnitude) less time.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
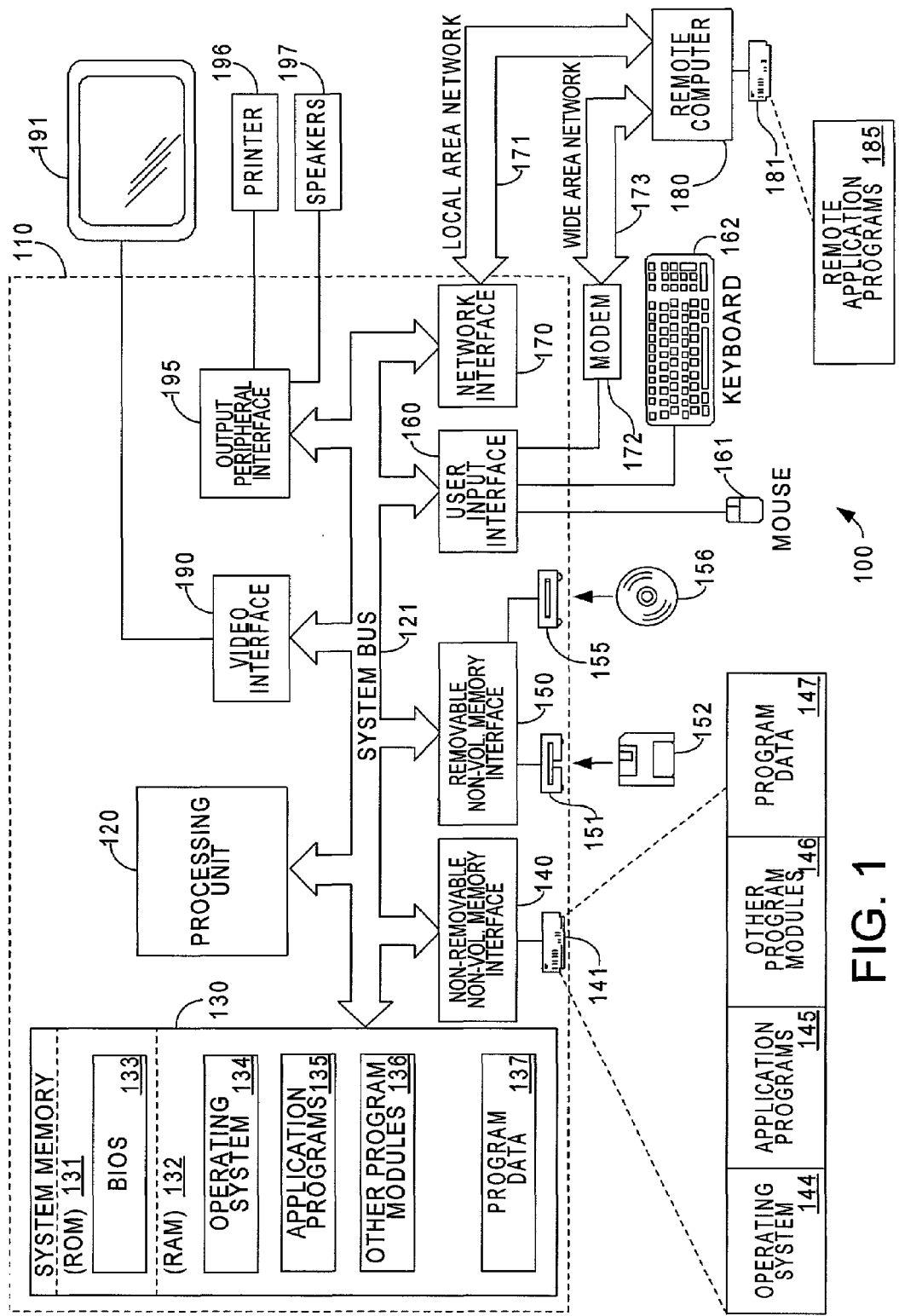
FIG. 1 is a simplified schematic drawing illustrating an exemplary architecture of a computing device upon which at least portions of the test matrix generation/execution method/program modules of the invention are executed.

Exemplary methods and a test model structure are disclosed herein below in accordance with embodiments of the invention. A method for generating a program module test model is disclosed. The test model facilitates creating a set of calls for submission to a program module under test that includes an interface definition identifying a set of input parameters. The disclosed method includes defining equivalence classes for each one of a set of input parameters to the program module. Each of the equivalence classes define a set of values for which any one of the set of values is considered representative of the class with regard to verifying proper operation of the program module. Such equivalence class definitions are rendered/modified at a variety of stages in the process of rendering a test model described further herein below.

The method also includes partitioning the set of input parameters of the program module into clusters. Each cluster consists of a set of related parameters (i.e., ones that exhibit a cross-influence behavior between one another with regard to execution of the program module). After defining clusters, groups are generated for each of the clusters. Each group represents a particular usage of the program module.

In an embodiment of the invention, the resulting test model is stored within a hierarchical structure including, at the highest level, at least one cluster element defining a set of group elements. Group elements defined under a same cluster element contain a same set of parameters.

Each group element defined under a particular cluster element represents a particular usage of the program module. For a particular group element, a set of parameter elements is defined. Each parameter element defined under a particular group element specifies a list of equivalence classes for a parameter in the context of the group (i.e., use).

A method is also disclosed for testing a program module according to the test model summarized herein above, including a set of cluster elements defining sets of group elements. Each group element, in turn defines/references a set of parameter elements. The method includes creating a set of calls to the program module by performing, for each call, an initial step of assigning a value to each parameter within a cluster under test. This assigning step includes (1) selecting, for the cluster, a parameter equivalence class combination including one equivalence class from each parameter element (comprising a list of equivalence classes for a particular parameter) defined under a particular group element, and (2) designating a representative value for each parameter within the cluster in accordance with the selected parameter equivalence class combination. The set of calls generated by the above steps are submitted to the program module under test. There are a variety of ways in which the combinations and values within particular equivalence classes can be selected. The present invention not only supports these variations, but also allows thorough testing to be performed utilizing a reduced number of calls to the program module under test. The reduction in the number of calls is facilitated by the introduction of groups (i.e., uses) to limit the combinations of parameters required to perform a covering test on a particular cluster.

In an embodiment of the present invention a computer implements the above-summarized steps, at least in part, by executing software instructions, such as program modules. Generally, program modules include routines, objects, components, data structures and the like that facilitate performing particular tasks or implementing particular abstract data types. The term "program" includes one or more program modules.

FIG. 1 illustratively depicts an example of a suitable operating environment 100 for carrying out at least a portion of the test matrix generation/execution scheme embodying the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
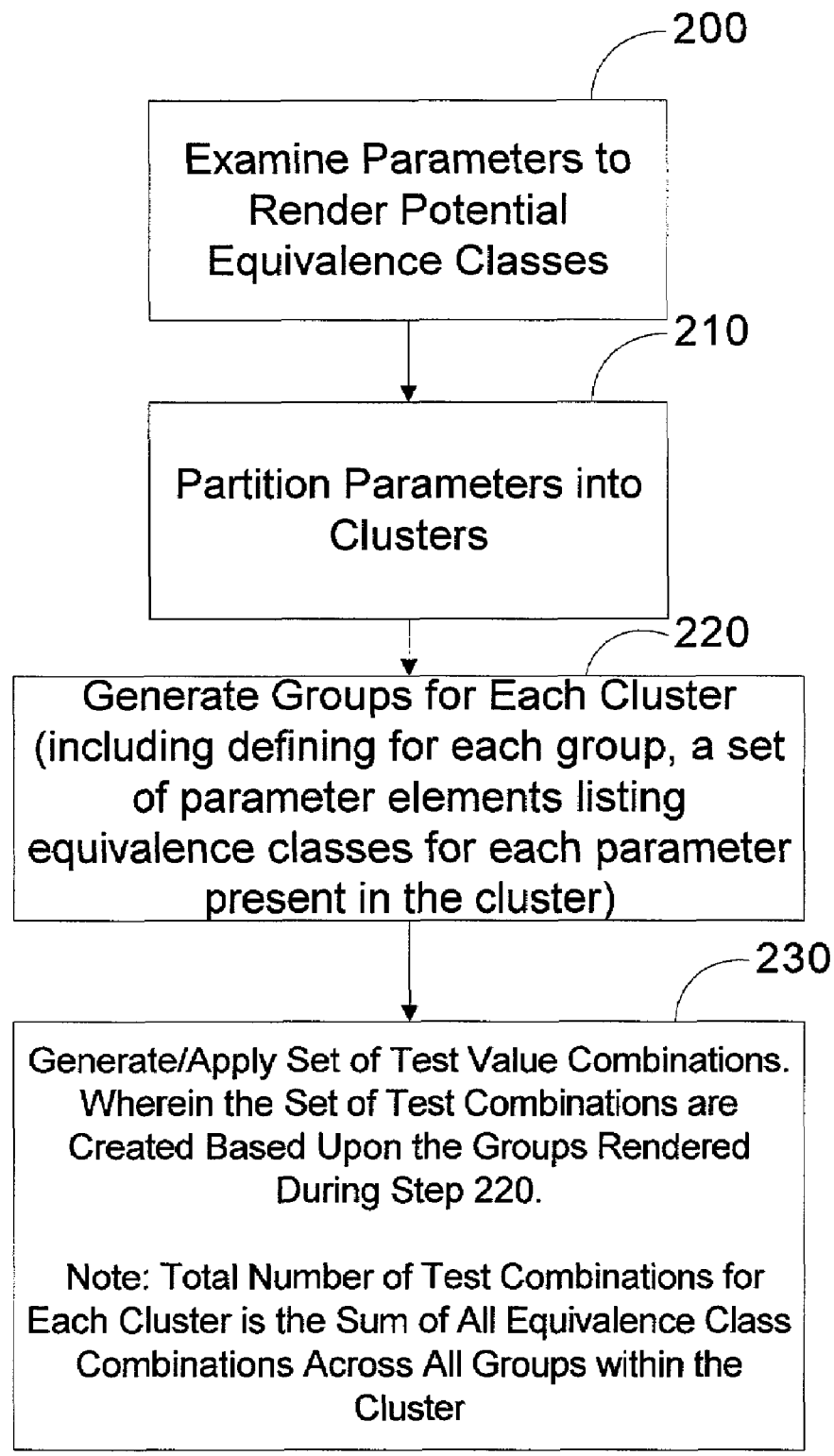
FIG. 2 is a flowchart summarizing a set of steps for creating a test model in accordance with an embodiment of the present invention.

Turning to FIG. 2, a flow chart summarizes a set of steps performed in a method for generating and applying a test matrix for a particular program module in accordance with an exemplary embodiment of the present invention. The method includes defining value equivalence classes for individual input parameters to the program module. As previously noted, such equivalence class definitions may be rendered at virtually any time including before/after defining the clusters and even while defining parameter elements comprising lists of parameter equivalence classes. This is especially true since, as demonstrated in the examples, the set of equivalence classes for a parameter potentially depends upon the particular use (i.e., "group") of a parameter cluster. The role of each parameter in the program module is examined to render clusters of parameters that are co-related (i.e., have an effect upon one another) in the context of the operation of the program module. Further examination of the clustered parameters renders groups defined according to particular uses of the clustered parameters. For each group, a set of equivalence classes is defined for each parameter of a cluster under which the group is specified.

After defining the parameter equivalence classes, a covering set of test input combinations are generated for each identified use of each cluster. A representative set of values, comprising the test inputs to the program module, are generated from each combination of parameter equivalence classes within each group. The covering set of test input combinations exercise the logical paths and functions within the program code of the program module under test.

In addition to testing valid parameter values, the exemplary method also contemplates observing operation of the program module when an invalid parameter value is provided. Thus, the covering set of test combinations ensures confirmation of the program for both valid and invalid parameter value combinations.

Before describing the method summarized in FIG. 2, a set of definitions are provided to aid in understanding the method steps.

Parameter: A place holder for a value passed by a caller to a program module having a defined interface (e.g., an API). The value is passed to the program module through a stack or by reference to a memory location. In the context of the MICROSOFT WINDOWS operating system, in the Win32 API CloseHandle, hObject is a parameter (e.g., CloseHandle(HANDLE hObject)).

Equivalence Class (EC): A set of values considered equivalent for purposes of test matrix parameter value combinations. Such equivalents are established, for example, by analysis of the program module operations and organization. In an embodiment of the invention, equivalence classes for a parameter correspond to executing a same logical decision (i.e., program code) path for each member of the equivalence class. All values within an EC have the same behavioral result (in the context of a particular use), and therefore all values in an EC are either valid or invalid—all must equally cause the program module to either succeed or fail, etc. Each member of an EC is capable of representing the whole set of values within the equivalence class to which it belongs for purposes of testing a particular program module in a particular mode of usage. In an embodiment of the invention, equivalence classes for a particular parameter are allowed to vary based upon the equivalence classes of other parameters within a group (in accordance with different uses of the program module). Furthermore, to obtain a higher level of assurance that all logical combinations are covered, the equivalence classes defined for a parameter element in a group may overlap (e.g., {all positive values} and {1}) such that a particular value exists within more than one equivalence class defined under a group's parameter element. The union of representative values identified within the set of equivalence classes for a parameter preferably represents the domain of all possible values for the parameter—including both valid and invalid values. In some instances complete coverage is not possible. An example of such an instance arises, by way of example, when the equivalence class is a variable length string. In such instance one could never cover the full range but could instead sample it at random or by selecting a reasonable sub-set of parameter values.

The following is an example of equivalence classes for a particular parameter in the context of a particular API, "sqrt(x)" which returns the square root of passed parameter value "x." In this simple example, the list of equivalence classes of the parameter x is: $\{x|x<0\}$, $\{0\}$, and $\{x|x>0\}$ (Negative numbers, zero, positive numbers). The union of the three identified value classes covers all the possible values of x.

Valid (Invalid) Equivalence Class: A particular EC holding values that are considered a valid (invalid) usage of the program module in a particular context. For example, in the above square root API referenced above, the negative numbers class $\{x|x<0\}$ is considered "invalid" (because the particular square root function (API) is only defined for non-negative numbers). The other two classes $\{0\}$ and $\{x|x>0\}$ are valid equivalence classes. It is noted that some otherwise valid ECs may become invalid when combined with other valid ECs. Consider, for example, an API, "power (x,y)" that calculates the result of 'x' to the power of 'y' ($x^y$). While $\{x|x=0\}$ and $\{y|y=0\}$ are both valid ECs in most cases, when put together (i.e. "power(0,0)") the values lead to an invalid combination. The special case (0,0) is thus represented in a separate group.

Orthogonal (or non-Related) parameters: Parameters that have no cross-influence between one another with regard to the execution of the program module. By way of example, consider the exemplary (fictitious) API "ChangeFont(color, size)" that changes a font's color and size. The parameters "color" and "size" are orthogonal because the value assigned to each of the two parameters is handled regardless of the value of the other. In contrast non-orthogonal parameters affect the behavior of the program module with regard to another parameter. Consider an API "search(name, address)" that takes two string parameter values and searches for records containing the two-string combination in a database. In this case name and address are not orthogonal because passing different addresses for the same name or different names on the same address will give different results.

Cluster (of parameters): A set of non-Orthogonal/Related Parameters. Consider, for example, a known Win32 API "FillRect(x1, y1, x2, y2, color, pattern)" that paints a rectangle defined by two corners with the desired color and fill pattern. The parameters x1, y1, x2 and y2 are processed as a group by the API to identify a rectangle on a graphical user interface. These four parameters are related, and therefore form the first cluster. The parameters color and pattern are treated in combination by the API and thus are also related. These two parameters form the second cluster. In contrast, the parameters across clusters (such as x1 and color) are Orthogonal because the value assigned to the parameter x1 has no effect upon the treatment by the FillRect API of the value assigned to the color parameter.

In the context of test matrix generation, the step of assigning parameters to clusters has the potential to significantly reduce the total number of combinations to adequately test the logical operation of a program module. In particular, since the values assigned to orthogonal parameters in distinct clusters do not affect one another, there is no need to multiply the parameter value combinations of different clusters to render a test matrix covering the logical operation of a program module. Instead, the total number of distinct parameter combinations is defined by the number of tests needed to cover the cluster that needs the largest number of combinations of parameter values (determined by the groups and parameter element equivalence classes defined under the cluster). In fact, since the values of a first cluster have no effect upon values specified for a second cluster, testing distinct parameter clusters is potentially/preferably covered in parallel by simultaneously varying/submitting the sets of values assigned to the parameters of clusters when testing the software module. Thus if a first cluster requires 500 combinations and a second cluster requires 700 combinations of parameter combinations, then only 700 calls to the program module under test are needed to test both clusters—as opposed to 1,200 calls if the clusters are tested sequentially.

The following demonstrates the above-described test matrix size reduction achieved, in part, by clustering variables. By way of example, an API needs 1000 distinct value combinations to cover testing aspects of the API relating to a first cluster including the parameters {x1, y1, x2, y2}. The API needs 50 distinct parameter value combinations to cover testing a second parameter cluster including the parameters {color, brush}. In an embodiment of the present invention, one need only call the software module (e.g., API) 1000 times to verify the proper logical operation of the software module. This number of calls is significantly less than the 50,000 calls needed for a method that provides all combinations between the two clusters. With regard to the further enhancement, by submitting the (50) tests for the second cluster with the 1000 test combinations submitted for the first cluster, a further reduction of 50 program module calls is achieved while ensuring that the software module operates properly.

Group (of Equivalence Classes): A set of equivalence classes of multiple parameters within a particular cluster. The set of equivalence classes within a group represents a particular usage of the program module when a set of representative values within the equivalence classes are assigned to the parameters within the cluster and submitted in a call to the program module. A group is a formalization of a conditional relation between the parameters of a cluster. The more conditional relations existing between the parameters, the more groups are defined to render a covering set of test matrix parameter value combinations. The union of groups, in a preferred test environment, represents all the possible usage modes (valid and invalid) of the parameters within a cluster.

By way of example, consider the well known Win32 API "SendMessage."
```
LRESULT SendMessage(
  HWND hWnd,   // handle to destination window
  UINT Msg,    // message
  WPARAM wParam, // first message parameter
  LPARAM lParam // second message parameter
);
```

The SendMessage API includes two clusters. The first cluster consists of the {hWnd} parameter alone. The second cluster includes the parameters Msg, wParam and lParam. There is only one group in the first cluster since there cannot be any conditional relation on just one parameter. However, with regard to the second cluster, the meaning of wParam and lParam change according to the value of the value assigned to the Msg parameter. If Msg is WM_KEYDOWN, then wParam is a virtual-key code and lParam is the key data. Thus, one group for the three parameters comprises:

Msg ∈{WM_KEYDOWN};
wParam ∈{valid key codes} or {invalid key codes}; and
lParam ∈{valid key data} or {invalid key data}

Note that this group includes four unique equivalence class combinations (1×2×2=4) because the wParam and lParam parameters each include two classes, and the Msg parameter has only a single value in the particular group. Furthermore, if Msg is WM_NULL, then both lParam and wParam are ignored—so this defines another group as defined above.

Msg ∈{WM_QUIT};
wParam ∈{any value};
lParam ∈{any value}

Note that this group needs just one value combination. In the context of the SendMessage API, groups are defined according to the Msg parameter. Therefore, the process of identifying groups (and associated equivalence value combinations within a group) is repeated for all possible Msg types (a few hundred) since there are no equivalence classes for the Msg values other than invalid Msg values. A total of a few hundred groups are thus identified. When generating/submitting a covering set of parameter value combinations, a test generator examines all groups and passes the program module (i.e., the SendMessage API) all combinations defined by the equivalence classes of parameters for that group (which is typically a small number). Thus groups within a cluster are covered sequentially, and the total number of combinations in the cluster is the sum of combinations needed for each group. The number of calls generated through the above described "grouping" to render a covering set is smaller than a test generation method that generates all combinations of equivalence classes of the cluster parameters—a number equal to multiplying the number of equivalence classes defined for each parameter within a cluster.

To demonstrate the power of the "grouping" dilution mechanism, consider and exemplary circumstance where there are 1000 Msg types (equivalence classes) for the SendMessage API previously referenced above. Before grouping, there are 50 equivalence classes for lParam and 40 for wParam. If all combinations of equivalences are tested, then 2,000,000 (1000×50×40) combinations are generated. Based upon observation of the operation and structure of the SendMessage API, the parameter cluster is broken down into (1000) groups based upon the Msg parameter type. Grouping typically renders, for example, three equivalence classes (ECs) for each Msg parameter type/group. Thus an estimated 9000 combinations (1*3*3+1*3*3+. . . =1000*9=9000) are needed to render a covering set of test parameter combinations for the 1000 Msg types/groups of the SendMessage API.

In contrast, the known PICT test matrix generator generates every combination of PAIRS within a cluster. Pair-wise combination generation results in a minimum of 1000*50 (50,000) combinations. The combinations cover all pairs of 'Msg' and 'lParam' while also trying to simultaneously cover all pairs of 'Msg' and 'wParam'; and 'lParam' and 'wParam.' PICT achieves partial reduction by trying to cover the 1000*40 and 50*40 combinations parallel to covering the required 1000*50 combinations. While requiring more API calls, the PICT test matrix generator does not guarantee coverage of trios (specific combinations of three values) whatsoever and therefore provides lesser assurance that the API will properly handle all submissions.

Having provided a set of definitions, attention is directed again to the flowchart set forth in FIG. 2. Initially during step 200 each parameter is examined to render a set of potential equivalence classes. The equivalence classes rendered during step 200 is the most conservative classification of equivalence classes for each parameter. As demonstrated herein, in the context of particular usage of a program module ("groups"), an attempt is made to consolidate and reduce the set of equivalence classes for parameters within a particular group. It is further noted that, as mentioned previously herein above, defining equivalence classes is often a task that is executed throughout the overall process of defining a test generation model for a given program module.

During step 210 the parameters are partitioned into clusters. As previously defined, a cluster includes all parameters that have an operational effect upon one another.

Thereafter, during step 220 all parameter clusters generated during step 210 are individually examined to identify all groups (i.e., uses of the combination of parameters within the cluster) and associated equivalence classes for each parameter within each group. During step 220, the equivalence classes are potentially revised and assigned to each parameter of a group.

After defining groups within each cluster, the groups are provided to a test matrix generator that, during step 230, generates and applies a set of test parameter value combinations based upon the groups and parameter equivalence classes defined by parameter elements within each group. However, before describing the test combination generation steps, a set of memory/organization structures and variables used in an exemplary test generation/application step 230 are defined. These structures are briefly described with reference to FIG. 3.

Parameter clusters for a particular program module (e.g., API) are referenced in arbitrary order within a cluster array 310 that includes a set of 'n' cluster elements. Each cluster element (e.g., cluster element 311) of the cluster array 310 corresponds to a particular cluster of parameters for the program module. The complete set of 'n' cluster array elements provides a non-overlapping coverage of all parameters within the particular program module. Since the parameters within each of the clusters are, by definition, independent of the parameters within other clusters, the clusters are potentially testable in parallel (with values independently assigned to the orthogonal parameters within the clusters). The exception to this general term arises in the case where an invalid parameter value causes a complete failure of the entire tested program module and therefore precludes observing the affect of the orthogonal parameter values on the program module.

Each cluster element includes a reference to an associated set of group elements. By way of example, cluster element 311 references a set of group elements 320. Group elements, as previously defined, correspond to particular uses of parameters within a cluster. The group elements are referenced in arbitrary order within the set of group elements 320 for a particular cluster. Each group element (e.g., group element 321) corresponds to a particular defined group/use of parameters within a cluster. In the illustrated exemplary embodiment, the cluster element 311 references the group array 320 containing 'm' defined groups corresponding to 'm' identified distinct uses of the cluster's parameters. The number of group elements can, in some instances, be quite large. In the above-provided example, a total of 1000 groups are assigned to the single parameter cluster for the SendMessage API.

Each group element includes a reference to a set of parameter elements. In the illustrated example set forth in FIG. 3, the group element 321 references a set of parameter elements 330. Each one of the parameter elements (e.g., parameter element 331) comprises a list of equivalence classes for one of the parameters of the cluster element (e.g. cluster element 311) to which the referencing group element (e.g., group element 321) belongs. A list of equivalence classes are specified for each parameter associated with a particular group element (e.g., group element 321). Thus, the group element 321 of the cluster element 311 for a cluster having 'k' parameters, references the set of parameter elements 330 having 'k' parameter elements arranged in any order. In the above-described example of the SendMessage API, three parameters were identified in the cluster (i.e., k=3). Thus, three parameter elements are provided for each group element defined under the cluster for the SendMessage API.

Each parameter element in the set of parameter elements 330 includes at least a parameter ID as well as a structure specifying a list of equivalence classes associated with the particular parameter. In a system for generating test matrices in accordance with an embodiment of the present invention, a common interface is provided to define all ECs. By way of example, one implementation will include a "Pick" function to select a value out of a type of equivalence class from a list of pre-configured equivalence class definitions. A user is also provided the opportunity to set an "isValid" flag identifying whether the defined equivalence class identifies valid values. The equivalence class definitions are referenced for a particular parameter such as, for example, a "Single value", "List of values", "Range of values", "Memory buffers", etc . . . The definition/selection portion of an embodiment of the present invention is extensible and as such supports defining new ECs as needed.

For purposes of calculating the number of combinations needed to cover a particular group of equivalence classes, the number of equivalence classes for a parameter within a group is represented by the variable $N_p[i]$ (where i equals the ith parameter in a particular group). The total number of combinations to provide a covering set for a particular group, $N_G$, is the product of the number of equivalence classes, $N_p[i]$, for each of the "k" parameters in the group. In the above-described example of the SendMessage API, three parameters were identified in the cluster (k=3). In one exemplary group, the Msg parameter contains one equivalence class while the lParam and wParam parameters include about three equivalence classes. Thus, the total number of combinations for the group, $N_G$, equals 9 (1*3*3).

The number of combinations for a particular cluster, $N_C$, is the sum of the combinations, $N_G$, for each identified group within the cluster. The sum of combinations needed to cover the Cluster [i] is assigned the value $N_C[i]$. The value $N_C$ is determined for each cluster identified within the array of clusters specified for the program module. The total number of combinations for purposes of generating and applying test input value combinations for all of the clusters (in parallel using single program module calls to simultaneously test multiple distinct clusters) equals the maximum value assigned to $N_C$ for one of the clusters. The value $N_C$ is determined for each cluster for a program module to be tested. The maximum value $Max(N_C)$ is assigned to the variable $N_T$.

Figure 3:
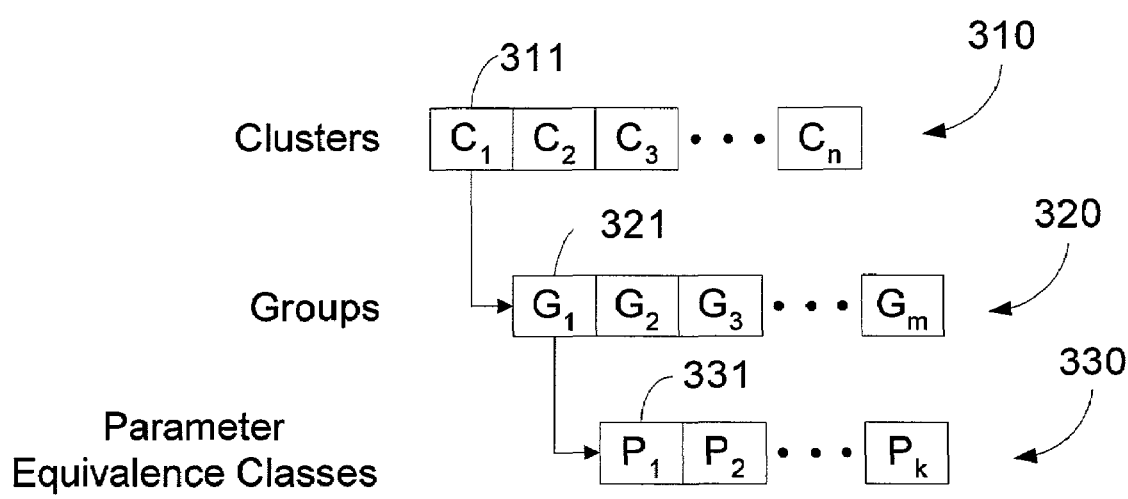
FIG. 3 is a schematic diagram depicting a structure for maintaining a test model for a particular program module.
Figure 4:
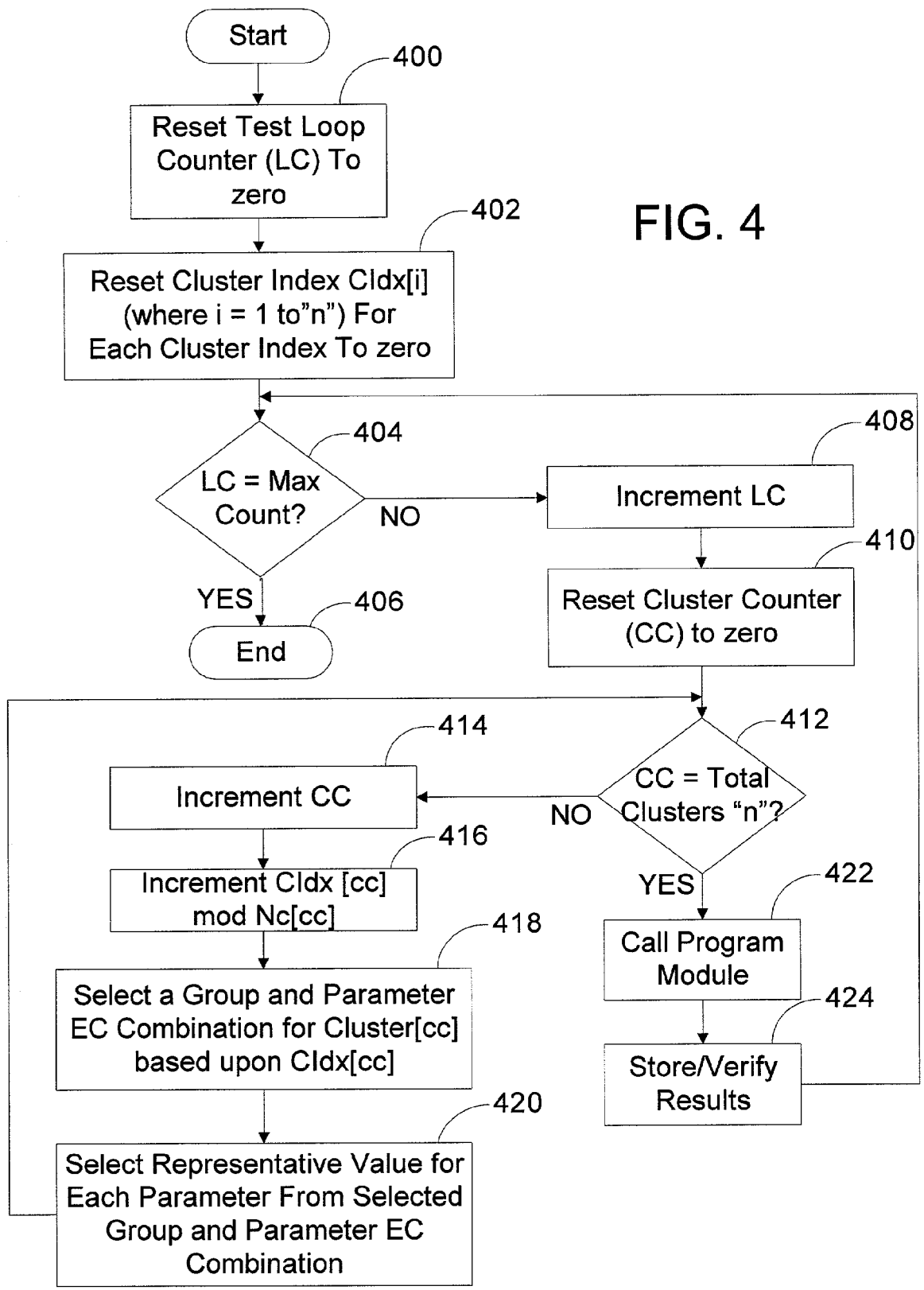
FIG. 4 is a flowchart summarizing the steps for generating a set of calls to a program module according to a test model generated according to the steps of FIG. 2.

After defining the parameters, clusters, groups, ECs, and determining the number of distinct group equivalence class combinations required to cover the program module for each cluster, the following test generation/application procedure, summarized in FIG. 4, is executed during step 230 of the flowchart depicted in FIG. 3. This exemplary embodiment contemplates testing all clusters for a particular program module (e.g., API) in parallel. Therefore, the loop is performed $N_T$ times. Referring now to FIG. 4, at step 400 a test loop counter for the test generator is initially set to zero. The loop counter value tracks the total number of parameter value test combinations rendered by the test combination generator.

Each one of the n clusters for a program module potentially/typically defines a distinct number of $mi_i$ groups (where $m_i$=number of groups in cluster i, i=1 . . . n), covering the operation of the program module. Therefore, a separate index counter CIdx[i], referencing the current group combination for each of the n clusters is maintained. Next, at step 402 the set of n index counters is set to zero. Alternatively, a single index counter is maintained and a mod function is performed on the index counter to render a value for selecting a combination for a particular cluster.

In an exemplary embodiment of the present invention, the test generation loop is executed at least $N_T$ times—the maximum count for the total number of group equivalence class combinations needed to cover a cluster of parameters. Thus, if clusters 1–3 require 750, 600, and 150 combinations respectively, then the maximum count equals 750. The three clusters are tested in parallel, and therefore the 600 and 150 combinations required for the second and third clusters are submitted at any time within the 750 calls required to cover the combinations for cluster 1. In this example, Cluster 3 will potentially be covered 5 times (750/150), while cluster 2 will be covered 1¼ times (750/600), which is of no relevance, as long as all clusters are covered completely at least once.

Step 404, the entry point of the test combination generation/submission loop, tests whether loop counter has reached the maximum count (e.g., 750). If the loop counter has reached the maximum count, then the test is completed for the particular program module. Control therefore passes to the End 406 wherein post-processing of the test results is performed. Otherwise, if the loop counter does not equal the maximum count, then the loop counter is incremented at step 408.

Next, at step 410, the process of generating and submitting a combination of test parameter values to the program module commences. As noted previously above, a set of parameter values are generated for each cluster during each iteration of the execution loop beginning at step 404. To facilitate assigning a combination for each cluster, a cluster counter (CC), that is set to zero during step 410, tracks which one of the set of "n" clusters is currently receiving test parameter values.

At step 412, if CC (indicating the number of clusters that have received values) does not equal the total number of clusters, then at least one parameter cluster has not yet received values. Control therefore passes to step 414 wherein the CC value is incremented (indicating a next cluster that will receive values). Next, at step 416 the cluster index value corresponding to the current CC (i.e., CIdx[cc]) is incremented. However, since a particular cluster may have fewer group combinations than other clusters, a mod function is applied to cause the counter to "wrap-around" when the count value reaches the total number of combinations Nc[cc].

Step 418 comprises a point where the test combination generator selects a particular combination of equivalence classes for the parameters in a group based upon the current value of CIdx[cc]. The mapping of an index value to a particular combination can be performed in any of many known mapping methods or mathematical transformations. The function of this particular step is to ensure that a reliable mapping of index values to combinations is present such that all intended group/equivalence class combinations for a cluster are covered over the course of the test generation/application process.

During step 420, after selecting a particular group/equivalence class combination, a set of representative parameter values falling within the combination of equivalence classes identified during step 418. There are many ways in which particular values are selected in accordance with alternative embodiments of the invention.

After selecting representative values for a currently referenced cluster, control returns to step 412. This loop is executed until all n clusters are assigned representative values for a current test count. After the n clusters have received parameter values (CC=n), control passes from step 412 to step 422. At step 422 a program module (e.g., API) call including the parameter values assigned for each cluster during step 420 is rendered. Thereafter, in an embodiment of the present invention the results of the program module call are stored and/or verified. Analysis of the results can occur either during step 424 or delayed until all calls have been performed.

Having described an exemplary set of steps for carrying out test matrix generation/application in accordance with an embodiment of the present invention, a number of potential modifications/supplementations are proposed in accordance with various embodiments of the invention.

A first refinement (A) to the steps set forth in FIG. 4 comprises examining the operation of only one cluster at a time rather than all clusters in parallel. The steps are modified such that the steps are performed a total of the sum of $N_C$ for all "n" clusters. Plus two additional runs are then performed. During the runs only the cluster currently under test is allowed to present values corresponding to invalid equivalence classes. The other clusters must include only values from valid equivalence classes. This restriction ensures that combinations containing valid combinations of each cluster are exercised by the program module and are not shadowed by invalid values assigned to parameters of other clusters. With regard to the first additional run, a "positive testing" run is executed using only valid values in all clusters before performing any of the other test runs. This is useful for detecting basic flaws in an API already at the beginning, saving considerable time. Note that this run may be skipped, since the runs that follow cover these combinations. With regard to the second additional run, the call to the program module includes invalid ECs from parameters of all clusters (to the extent such classes exist). This last run might find problems related to combinations of invalid values.

A second refinement (B) comprises the introduction of a shuffling procedure to selection of groups of equivalence classes during step 418. In a particular example, prime-number shuffling is performed. Shuffling ensures that the order in which the program module receives values corresponding to the parameter equivalence class combination differs for each run. The second refinement increases variations between runs, and thus increases the chance to find improper behavior when the program module has some internal hidden state that is effected by a specific sequence of calls and values.

A third refinement (C) comprises a way to potentially further reduce the number of test calls by only submitting an invalid equivalence class once. In particular, before calling the program module at step 422, count the number of invalid ECs that were selected during step 418. If the number is greater than one, the program module (e.g., API) call can potentially be skipped (diluted). This refinement can potentially be implemented when there exists good internal knowledge of the program module parameter validity code. Such refinement is proper when the program module first tests for the validity of each parameter, before starting to process the call, and will return an error code on the first invalid parameter it finds. Under these conditions, passing one or more invalid parameters is equivalent (same code path) and therefore the dilution is justified.

A fourth refinement (D) comprises passing a validity bit to the verification code. Before calling the program module at step 422, the test call generator determines whether any invalid ECs were selected during step 418. The validity information is passed to the verification code executed during step 424. This single bit of information potentially reduces the complexity and increases the power of the verification code. To further enhance this refinement, the validity bit can be replaced with an array of bits (e.g. a DWORD value), where each bit can indicate a specific expected type of error in the current module call. Each EC will define not only "valid/invalid", but such information as "should call return an error", "should call throw an exception", "should call cause the computer to crash" etc. The value passed during the verification process is the bitwise OR of all the selected ECs' for this run, indicating the collective expected errors generated in this module call (all bits reset indicating expected success).

A fifth refinement (E) comprises introducing a stress mode for repeatedly executing the code (with selection mechanisms programmed to ensure submission of unique combinations from iteration to iteration of the test code). Since different parameters are picked and calls are generated in a different order, this refinement might expose errors in the definitions of the ECs, groups and clusters. This might also find long-haul problems such as memory or resource leaks.

A sixth refinement (F) introduces a reproduction token to the testing procedure. Before selecting parameter values for a particular group equivalence class combination during step 420, a unique token is generated. The unique token contains the full details of the cluster being examined, the group selected in each cluster and a prime seed value (from which all pseudo-random choices of ECs and selected values inside each EC are made). The token can later be handed to stage 404 (the entry point of the test combination generation/submission loop) to restore a desired state, in order to reproduce a problem, or a desired sequence of test parameters (once a specific state of the system is reached, all subsequent calls are deterministic, which is good for Reproduction mode).

A seventh refinement (G) addresses the potential situation where a parameter itself references another parameter that includes a set of parameters that include multiple equivalence classes. In many cases, a parameter is a pointer to a structure which itself contains many parameters and ECs (such as buffers of various types and access rights, ACLs, complex strings, etc.). These are wrapped up and automatically produce a value, which is presented to the user as a single value but broken up inside into many parameters and dependencies. In an embodiment of the invention, the test sequence group/equivalence class generator exposes (and then covers) all non-equivalent values (i.e. of different ECs). The complex test characterization structures are potentially reusable in other tests (e.g., buffers), or even become generators for common use ("String Generators", "Buffer Generators", etc.). In an embodiment, such special purpose generators are configured to cover specific special cases.

In accordance with yet another refinement (H), invalid values are disregarded completely. In such an embodiment, referred to as "positive value testing," the test call generator submits only valid parameter values to the program module. In combination with the "stress mode" refinement, the test matrix tool and methodology can render a powerfull generator of pseudo-random program module calls. For example, such a refinement can be used to make calls to Microsoft's Message Queuing (MSMQ) API 'MQSendMessage' to flood a computer with random packets of valid information.

In accordance with yet another exemplary refinement (I), an investigation utility is added to the above-described test matrix generation system. The investigation component is invoked from inside a test call loop when an error is detected in the API call. Rather than stumble over a same error again and again, the "investigation mode" freezes the test matrix program module call cycle and substitutes parameters one by one to determine which ECs of a parameter are causing the failure. Since only one parameter is examined at a time, the entire investigation cost increases linearly (the SUM of all the ECs, not their product). The investigation results are stored in a BTDT ("Been There, Done That") database and diluted so that similar errors are presented to the user as a summary (e.g. "if you call the API with x=5, y=8 and any value in z, the API will fail"). This mode is only called upon failure, which is normally rare. The dilution potentially saves significant time later in the run, and minimizes the volume of error data in a Test Error Logfile, reducing "noise".

Having described an exemplary system and method for carrying out test matrix generation and several modifications thereto, attention is now directed to another example of an embodiment of the present invention applied to an API. In the specific example that follows, the number of combinations after applying each technique is given. An approximated time to cover the tests (assuming one combination per second) is also provided.

Consider the following API:

BOOL CalcAndCompare( CHAR*X1, CHAR Op1, CHAR*Y1, CHAR*X2, CHAR Op2, CHAR*Y2)

In the above API, Op1 and Op2 may be "+", "−", "*", "/", and "√" (Square root). The API returns TRUE if and only if (X1Op1Y1==X2Op2Y2). Examples of the API call and corresponding results are provided below.

CalcAndCompare(2,^,4,32,/,2)==TRUE
CalcAndCompare(1.5,*,4,5,+,1)==TRUE
CalcAndCompare(1,+,1,1,−,1)==FALSE As described herein above in an embodiment of the invention, during step 200, a preliminary set of equivalence classes are defined for each parameter. In the above example, the parameters X and Y have at least 15 ECs each: <{Positives}, {0}, {Negatives}, {NULL}, {Invalid Ptr}, {Ptr to junk}, {Non numeric}, {Hex}, {Oct}, {Scientific notation}, {Trailing spaces}, {boundaries} . . . >. The operator parameter "OP" has at least 7 ECs defined: <{"+"}, {"−"},{"*"},{"/"},{"^"},{"√"},{invalid operator}>. If only the first step is utilized to render a test matrix, then the total number of combinations is $15^4 * 7^2$ (2,480,625). If one combination is checked every second, the test will take approximately one month to complete.

During step 210, parameters are clustered. This step eliminates many tests involving exercising combination between orthogonal parameters. In the context of the current example, the parameters are partitioned to form two clusters:

$$\{X_1, Op_1, Y_1\} \text{ and } \{X_2, Op_2, Y_2\}.$$

The total number of combinations needed to cover the orthogonal parameter sets (and testing the sets simultaneously) equals max($15^2*7$, $15^2*7$) or 1575. Such testing of even this very simple API would occupy roughly one-half hour.

Finally, during step 220 the clusters are analyzed to render the following four groups of equivalence classes described herein below. The number of combinations associated with each group is provided in parentheses. Since the two clusters are equivalent, we need only summarize the group equivalence classes and their combination totals for one of the two clusters. It is noted that there are many more ECs for each parameter. The additional ECs are omitted for brevity.

Group 1: (4*10*10 or 400 combinations)

Op $\in$ {"+"} or {"−"} or {"*"} or {invalid operator}

X and Y $\in$ {Any Decimal} or {NULL} or {Invalid Ptr} or {Ptr to junk} or {Non numeric} or {Hex} or {Oct} or {Scientific notation} or {Trailing spaces} or {Leading spaces}

Group 2 (2*10*11 or 220 combinations)

op $\in$ {"/"} or {invalid operator}

X $\in$ {Any Decimal} {NULL} or {Invalid Ptr} or {Ptr to junk} or {Non numeric} or {Hex} or {Oct} or {Scientific notation} or {Trailing spaces} or {Leading spaces}

Y $\in$ {0} {Y|Y$\neq$0} {NULL} or {Invalid Ptr} or {Ptr to junk} or {Non numeric} or {Hex} or {Oct} or {Scientific notation} or {Trailing spaces} or {Leading spaces}

Group 3: (1*12*1 or 12 combinations)

op includes {"$\sqrt{}$"};

X includes {X|X>0}, {0}, {X|X<0} {NULL} or {Invalid Ptr} or {Ptr to junk} or {Non numeric} or {Hex} or {Oct} or {Scientific notation} or {Trailing spaces} or {Leading spaces}; and Y includes {Any value} because it is ignored.

Group 4: (1*1*1 or 1 combination)

op includes {invalid operator}.

X,Y include {Any value} because any value should fail.

The total number of combinations on each of the two clusters is 400+220+12+1 or 633. Finally, the total number of combinations (assuming parallel testing of clusters) equals max(633,633). Thus, the test time is further reduced to about 10.5 minutes (or about one third the time if only step 210 is performed prior to generating the test calls.

It will be appreciated by those skilled in the art that a new and useful method and system for generating and applying a test matrix for a program module, such as an API, has been described herein. In view of the many possible computing environments to which the principles of this invention may be applied and the flexibility of designing and carrying out software test tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computer implemented method for generating a test model facilitating creating a set of test calls for submission to a program module that includes an interface definition identifying a set of input parameters, the method comprising the steps of:

defining equivalence classes for each one of the set of input parameters, each equivalence class defining a set of values wherein anyone of the set of values is considered representative of the equivalence class with regard to verifying proper operation of the program module such that each one of the set of values has the same behavioral result in the context of a particular use of the program module;

partitioning the set of input parameters into a set of one or more clusters, wherein input parameters assigned to differing clusters exhibit no cross-influence behavior between one another with regard to execution of the program module; and generating a set of groups for each cluster, each group defining a set of parameter elements corresponding to a particular usage of program module input parameters assigned to a cluster such that each group within a cluster is a formalization of a conditional relation between the parameter elements of a cluster, and wherein the set of parameter elements are thereafter used to assign combinations of values to the input parameters in accordance with the parameter elements defined for the particular usage, and the assigned combinations of values are submitted in a call to the program module during a testing procedure.

2. The method of claim 1 wherein each parameter element comprises a set of equivalence classes for a particular parameter.

3. The method of claim 2 wherein a covering set of test combinations for a cluster is rendered from a summation, across all groups for a cluster, of distinct equivalence class combinations rendered from the equivalence classes defined for each parameter element.

4. The method of claim 2 wherein the union of a set of equivalence classes for a parameter element covers all potential values for a parameter corresponding to the parameter element in the context of a particular use.

5. The method of claim 4 wherein at least two equivalence classes of a set of equivalence classes for a particular parameter element overlap.

6. The method of claim 2 wherein a set of equivalence classes for a particular parameter element include at least one invalid equivalence class.

7. The method of claim 2 wherein at least two clusters are defined during the partitioning stage, and wherein a first set of parameters and a second set of parameters defined for respective first and second clusters are non-overlapping.

8. The method of claim 1 wherein a union of all equivalence classes for an input parameter does not represent all possible values for the input parameter.

9. The method of claim 1 wherein a union of all groups within the set of groups represents all contemplated modes of using the set of input parameters.

10. The method of claim 1 further comprising storing the test model as a data structure comprising:

for each cluster, a set of group elements corresponding to groups defined under each cluster, and for each group element, a set of parameter elements, and wherein each parameter element defines a set of equivalence class elements for a particular parameter to which the parameter element corresponds.

11. A computer implemented method for testing a program module according to a test model comprising a set of one or more clusters for which a set of groups are defined, wherein each group defines a set of parameter elements corresponding to a particular usage of program module input parameters assigned to a cluster, and each parameter element comprises a set of equivalence classes for a parameter, the method comprising:

creating a set of calls to the program module, wherein the creating step includes, for a call within the set of calls, the further sub-step of:

first assigning a value to each one of a first set of parameters within a first cluster under test, wherein the first set of parameters exhibit cross-influence behavior between one another with regard to execution of the program module, the assigning step comprising the sub-steps of:

first selecting, for the first cluster, a group, which is a formalization of a conditional relation between the parameter elements of a cluster, second selecting an equivalence class from each one of the set of parameter elements for the selected group, and designating, for each selected equivalence class, a representative value within the selected equivalence class with regard to verifying proper operation of the program module such that the representative value has the same behavioral results in the context of a particular use of the program module as other values within the selected equivalence class; and submitting the set of calls containing the designated representative values to the program module under test.

12. The method of claim 11 wherein the first assigning step is performed in accordance with a cluster index value that maps to a particular combination of equivalence classes corresponding to a group and set of equivalence classes designated during the first and second selecting steps.

13. The method of claim 11 wherein an order in which particular combinations of equivalence classes corresponding to a group and set of equivalence classes designated during the first and second selecting steps is modified for differing runs of a test generator.

14. The method of claim 11 wherein the creating step further comprises the sub-step of second assigning a value to each one of a second set of input parameters orthogonal to the first set of parameters such that the second set of input parameters exhibit no cross-influence behavior to the first set of parameters with regard to execution of the program module.

15. The method of claim 14 wherein the second set of input parameters correspond to a second cluster and wherein the second assigning sub-step comprises:

second assigning a value to each one of the second set of parameters within the second cluster, the second assigning step comprising the sub-steps of:

first selecting, for the second cluster, a group, second selecting an equivalence class from each one of the set of parameter elements for the selected group, and designating, for each selected equivalence class, a representative value within the selected equivalence class.

16. The method of claim 14 wherein the second set of input parameters consists of all the parameters that are not within the first cluster, and wherein the second assigning sub-step comprises assigning values to each one of the second set of input parameters from valid equivalence classes.

17. The method of claim 11 wherein a counter of created calls containing at least one value from an invalid equivalence class is maintained and wherein, once the counter reaches a particular count value, created calls containing at least a value representing an invalid parameter class are discarded without passing the call to the program module under test, wherein an invalid equivalence class is defined as a particular equivalence class holding values that are considered an invalid usage of the program module in a particular context.

18. The method of claim 11 wherein a validity code is appended to each call rendered by the creating step, the validity code indicating the presence of at least one invalid value assigned to a parameter during the first assigning step, wherein an invalid value is defined as a value assigned to a parameter of a particular equivalence class holding values that are considered an invalid usage of the program module in a particular context.

19. The method of claim 11 further comprising executing the creating step multiple times on the first cluster, and modifying selection of a representative value for input parameters of the first cluster each one of the multiple times.

20. The method of claim 11 further comprising generating a reproduction token for a particular execution of the creating a set of calls step, wherein the reproduction token includes details of the first cluster under test, the group selected for the first cluster, and the representative value for the group.

21. The method of claim 11 wherein the first assigning step comprises assigning values to a parameter that itself comprises embedded parameters, and wherein the equivalence classes for a parameter element expose equivalences classes for the embedded parameters.

22. The method of claim 11 wherein an invalid value is defined as a value assigned to a parameter of a particular equivalence class holding values that are considered an invalid usage of the program module in a particular context, and wherein created calls containing at least a value representing an invalid parameter are discarded without passing the call to the program module under test.

23. The method of claim 22 further comprising executing the creating step multiple times on the first cluster, and modifying selection of a representative value for input parameters of the first cluster each one of the multiple times.

24. The method of claim 11 further comprising an investigation step executed in association with the submitting step, wherein the investigation step is performed in response to detecting an error in a call, and wherein the investigation step performs a set of parameter substitutions to determine which one of the set of parameter equivalence classes caused the error.

25. A computer-readable medium including computer-executable instructions for testing a program module according to a test model comprising a set of one or more clusters for which a set of groups are defined, wherein each group defines a set of parameter elements corresponding to a particular usage of program module input parameters assigned to a cluster, and each parameter element comprises a set of equivalence classes for a parameter, the computer-executable instructions facilitating executing the steps of:

creating a set of calls to the program module, wherein the creating step includes, for a call within the set of calls, the further sub-step of:

first assigning a value to each one of a first set of parameters within a first cluster under test, wherein the first set of parameters exhibit cross-influence behavior between one another with regard to execution of the program module, the assigning step comprising the sub-steps of:

first selecting, for the first cluster, a group, which is a formalization of a conditional relation between the parameter elements of a cluster, second selecting an equivalence class from each one of the set of parameter elements for the selected group, and designating, for each selected equivalence class, a representative value within the selected equivalence class with regard to verifying proper operation of the program module such that the representative value has the same behavioral results in the context of a particular use of the program module as other values within the selected equivalence class; and submitting the set of calls containing the designated representative values to the program module under test.

26. The computer-readable medium of claim 25 wherein the first assigning step is performed in accordance with a cluster index value that maps to a particular combination of equivalence classes corresponding to a group and set of equivalence classes designated during the first and second selecting steps.

27. The computer-readable medium of claim 25 wherein an order in which particular combinations of equivalence classes corresponding to a group and set of equivalence classes designated during the first and second selecting steps is modified for differing runs of a test generator.

28. The computer-readable medium of claim 25 wherein the creating step further comprises the sub-step of second assigning a value to each one of a second set of input parameters orthogonal to the first set of parameters such that the second set of input parameters exhibit no cross-influence behavior to the first set of parameters with regard to execution of the program module.

29. The computer-readable medium of claim 28 wherein the second set of input parameters correspond to a second cluster and wherein the second assigning sub-step comprises:

second assigning a value to each one of the second set of parameters within the second cluster, the second assigning step comprising the sub-steps of:

first selecting, for the second cluster, a group, second selecting an equivalence class from each one of the set of parameter elements for the selected group, and designating, for each selected equivalence class, a representative value within the selected equivalence class.

30. The computer-readable medium of claim 28 wherein the second set of input parameters consists of all the parameters that are not within the first cluster, and wherein the second assigning sub-step comprises assigning values to each one of the second set of input parameters from valid equivalence classes.

31. The computer-readable medium of claim 25 wherein a counter of created calls containing at least one value from an invalid equivalence class is maintained and wherein, once the counter reaches a particular count value, created calls containing at least a value representing an invalid parameter class are discarded without passing the call to the program module under test, wherein an invalid equivalence class is defined as a particular equivalence class holding values that are considered an invalid usage of the program module in a particular context.

32. The computer-readable medium of claim 25 wherein a validity code is appended to each call rendered by the creating step, the validity code indicating the presence of at least one invalid value assigned to a parameter during the first assigning step, wherein an invalid value is defined as a value assigned to a parameter of a particular equivalence class holding values that are considered an invalid usage of the program module in a particular context.

33. The computer-readable medium of claim 25 further comprising executing the creating step multiple times on the first cluster, and modifying selection of a representative value for input parameters of the first cluster each one of the multiple times.

34. The computer-readable medium of claim 25 further comprising generating a reproduction token for a particular execution of the creating a set of calls step, wherein the reproduction token includes details of the first cluster under test, the group selected for the first cluster, and the representative value for the group.

35. The computer-readable medium of claim 25 wherein the first assigning step comprises assigning values to a parameter that itself comprises embedded parameters, and wherein the equivalence classes for a parameter element expose equivalences classes for the embedded parameters.

36. The computer-readable medium of claim 25 wherein an invalid value is defined as a value assigned to a parameter of a particular equivalence class holding values that are considered an invalid usage of the program module in a particular context, and wherein created calls containing at least a value representing an invalid parameter are discarded without passing the call to the program module under test.

37. The computer-readable medium of claim 36 further comprising executing the creating step multiple times on the first cluster, and modifying selection of a representative value for input parameters of the first cluster each one of the multiple times.

38. The computer-readable medium of claim 25 further comprising an investigation step executed in association with the submitting step, wherein the investigation step is performed in response to detecting an error in a call, and wherein the investigation step performs a set of parameter substitutions to determine which one of the set of parameter equivalence classes caused the error.

* * * * *

UNITED STATES PATENT AND TRADEMARK OFFICE
CERTIFICATE OF CORRECTION

| | | |
|---|---|---|
| PATENT NO. | : 7,032,212 B2 | Page 1 of 1 |
| APPLICATION NO. | : 10/139846 | |
| DATED | : April 18, 2006 | |
| INVENTOR(S) | : Erez Amir et al. | |

It is certified that error appears in the above-identified patent and that said Letters Patent is hereby corrected as shown below:

In column 16, line 12, delete "powerfill" and insert -- powerful --, therefor,

Signed and Sealed this

Sixth Day of April, 2010

David J. Kappos
*Director of the United States Patent and Trademark Office*